United States Patent
Hwang (10) Patent No.: US 8,495,401 B2
(45) Date of Patent: Jul. 23, 2013

(54) IMAGE FORMING APPARATUS AND CONTROL METHOD THEREOF

(75) Inventor: In-Su Hwang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 453 days.

(21) Appl. No.: 12/794,512

(22) Filed: Jun. 4, 2010

(65) Prior Publication Data

US 2011/0093727 A1   Apr. 21, 2011

(30) Foreign Application Priority Data

Oct. 20, 2009   (KR) ........................ 10-2009-0099796

(51) Int. Cl.
*G06F 1/32*   (2006.01)
*G06F 1/26*   (2006.01)

(52) U.S. Cl.
USPC ........................... 713/320; 713/323; 713/324

(58) Field of Classification Search
None
See application file for complete search history.

(56) References Cited

U.S. PATENT DOCUMENTS

2011/0019225 A1 *   1/2011   Jung .............................. 358/1.15
2011/0093727 A1 *   4/2011   Hwang .......................... 713/320

FOREIGN PATENT DOCUMENTS

| JP | 10-193750 | 7/1998 |
|---|---|---|
| JP | 2003-280107 | * 10/2003 |
| JP | 2005-246724 | 9/2005 |

OTHER PUBLICATIONS

Machine translation of JP 2003-280107, published Oct. 2, 2003.*
English language abstract of JP 2005-246724, published Sep. 15, 2005.
Machine English language translation of JP 2005-246724, published Sep. 15, 2005.
English language abstract of JP 10-193750, published Jul. 28, 1998.
Machine English language translation of JP 10-193750, published Jul. 28, 1998.

* cited by examiner

Primary Examiner — Tanh Nguyen
(74) Attorney, Agent, or Firm — Staas & Halsey LLP (57) ABSTRACT

Disclosed is an image forming apparatus includes an imaging forming unit configured to form an image; a main controller configured to control an operation of the imaging forming unit; a USB interface configured to receive and to transmit USB data from and to a host apparatus; a power supply configured to supply power to the image forming unit and the main controller; a switch configured to supply power selectively under the control of the main controller; and a sub controller configured to output a power control signal for turning on the switch if USB data is received from the host apparatus in a sleep mode during which the main controller is turned off. Power consumption is thereby reduced by turning off the power to the main controller in the sleep mode.

16 Claims, 5 Drawing Sheets

IMAGE FORMING APPARATUS AND CONTROL METHOD THEREOF

CROSS-REFERENCE TO RELATED APPLICATION

This application claims priority from Korean Patent Application No. 10-2009-0099796, filed on Oct. 20, 2009 in the Korean Intellectual Property Office, the disclosure of which is incorporated herein by reference in its entirety.

TECHNICAL FIELD

The present disclosure relates generally to an image forming apparatus and a method of controlling thereof, and more particularly, to an image forming apparatus, and a method of controlling the same, configured to reduce power consumption in a sleep mode.

BACKGROUND OF RELATED ART

An image forming apparatus, such as a printer or a multi-function printer, includes a system for performing an image forming process, which generally requires a significant amount of power consumption. Accordingly, when the image forming process is not being performed, the image forming apparatus is preferably in a sleep mode.

To that end, a conventional image forming apparatus may typically reduce the power consumption by preventing power from being supplied to various elements, such as an image forming unit, a scanning unit, an operating panel equipment (OPE), and/or the like, which are not typically necessarily to be operational during the sleep mode.

However, according to the conventional method, even when the image forming apparatus is in the sleep mode, power is still supplied to the main controller, i.e., a logic IC including an application specific integrated circuit (ASIC), a random access memory (RAM), and a read only memory (ROM) to, for example, monitor whether a printing command is transferred from a user or from a host computer through an interface, e.g., a USB interface.

The logic IC functioning the main controller typically requires several watts or more of power. It is thus desirable to further reduce the power consumption when the image forming apparatus is in the sleep mode.

SUMMARY OF DISCLOSURE

An image forming apparatus and a method of controlling the same are provided to reduce power consumption by turning off power of the main controller during a sleep mode. A sub controller may be used to monitor data received through a host interface such as, for example, a USB interface, when the main controller is turned off, thus improving operation reliability during the sleep mode. The sub controller may further allows for the main controller to switch to the normal operational mode.

According to an aspect of the present disclosure, an image forming apparatus may be provided to include: an imaging forming unit configured to form an image, a main controller configured to control an operation of the imaging forming unit, a universal serial bus (USB) interface configured to receive and to transmit USB data from and to a host apparatus, a power supply configured to supply power to the image forming unit and the main controller, a switch configured to selectively supply power based upon a control of the main controller and a sub-controller configured to output a power control signal for turning on the switch in response to USB data received from the host apparatus in a sleep mode. The sleep mode may comprise a power mode during which the main controller is turned off.

The sub-controller may be configured to output the power control signal if a pre-setting data having a predetermined value is received.

The sub-controller may comprise an amplifier, a serial to parallel circuit and an enable logic circuit. The amplifier may be configured to amplify a serial signal received from the host apparatus. The serial to parallel circuit may be configured to convert the amplified serial signal to a parallel signal. The enable logic circuit may be configured to generate the power control signal for turning on the switch by receiving and processing the converted parallel signal.

When the switch is turned on in response to the power control signal output from the sub-controller, the switch may supply power to the main controller so as to change a power state of the main controller from the sleep mode to a normal mode.

Information indicative of the power state of the main controller may be transmitted to the host apparatus through the USB interface. The printing data may be received from the host apparatus subsequent to the transmission of the information indicative of the power state of the main controller.

The main controller may be configured to maintain an on state of the switch even if the power control signal output by the sub-controller changes after a change in a power state of the main controller from the sleep mode to a normal mode.

The image forming apparatus may further comprise a storage device configured to store information relating to a duration of time the image forming apparatus is to remain idle before a change in the power state of the image forming apparatus from a normal mode to the sleep mode is to take place. The main controller may cause the switch to be turned off if the duration of time has elapsed without receiving a printing command.

According to another aspect of the present disclosure, there may be provided a method of controlling an image forming apparatus that includes an imaging forming unit configured to form an image; a main controller configured to control an operation of the imaging forming unit, a universal serial bus (USB) interface configured to receive and to transmit USB data from and to a host apparatus, a power supply configured to supply power to the image forming unit and the main controller, and a switch configured to selectively supply power under a control of the main controller. The control method may comprise the steps of: monitoring whether USB data is received from the host apparatus while the image forming apparatus is in a sleep mode, the sleep mode being a power mode during which the main controller is turned off; and outputting a power control signal for turning on the switch based on the received USB data.

The step of outputting the power control signal may be performed if a pre-setting data having a predetermined value is received.

The step of outputting of a power control signal may comprise amplifying a serial signal received from the host apparatus; converting the amplified serial signal to a parallel signal; and generating the power control signal for turning on the switch by processing the converted parallel signal.

The method may further comprise changing a power state of the main controller from the sleep mode to a normal mode by turning on the switch to supply the power to the main controller.

The method may further comprise transmitting information indicative of the power state of the main controller to the host apparatus; and receiving printing data from the host apparatus.

The method may further comprise changing the power control signal to an off signal; and controlling the switch to maintain an on state of the switch.

The method may further comprise storing information relating to a time duration without a printing command before changing the power mode of the image forming apparatus from a normal mode to the sleep mode; and controlling the switch to be turned off to change the power mode of the image forming apparatus to the sleep mode if the time duration has elapsed.

According to yet another aspect, an image forming apparatus may be provided for forming an image based on image data received through a communication interface and for operating selectively in at least a normal mode and a sleep mode in which the image forming apparatus consumes less power than in the normal mode. The image forming apparatus may comprise a main controller, a switch and a sub-controller. The main controller may be configured to control image forming operation of the imaging forming apparatus. The switch may be switchable between an ON state in which the main controller is allowed to receive operational power so as to allow the image forming apparatus to operate in the normal mode and an OFF state in which the main controller does not receive the operational power so as to cause the image forming apparatus to operate in the sleep mode, and may be configured to switch to the OFF state in response to a first power control signal received from the main controller. The sub-controller may be configured to receive data from the communication interface and to output, based on the data received from the communication interface, a second power control signal to the switch, the second power control signal that causes the switch to switch to the ON state.

The main controller may be configured output the first power control signal upon determination that a pre-determined period of time has elapsed in the normal mode without a printing command being received thorough the communication interface.

The sub-controller may further be configured to determine whether the data received from the communication interface matches a pre-setting data and to output the second power control signal upon determination that the received data matches the pre-setting data.

The image forming apparatus may further comprise a data storage device having stored therein the pre-setting data.

The communication interface may comprise a universal serial bus (USB) interface.

The sub-controller may consume less power to operate than the operational power of the main controller.

BRIEF DESCRIPTION OF THE DRAWINGS

Various features and advantages of the disclosure will become more apparent by the following detailed description of several embodiments thereof with reference to the attached drawings, of which.

DETAILED DESCRIPTION OF SEVERAL EMBODIMENTS

Reference will now be made in detail to several embodiments of the present invention, examples of which are illustrated in the accompanying drawings, wherein like reference numerals refer to like elements. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should be also noted that in the drawings, the dimensions of the features are not intended to be to true scale and may be exaggerated for the sake of allowing greater understanding.

Figure 1:
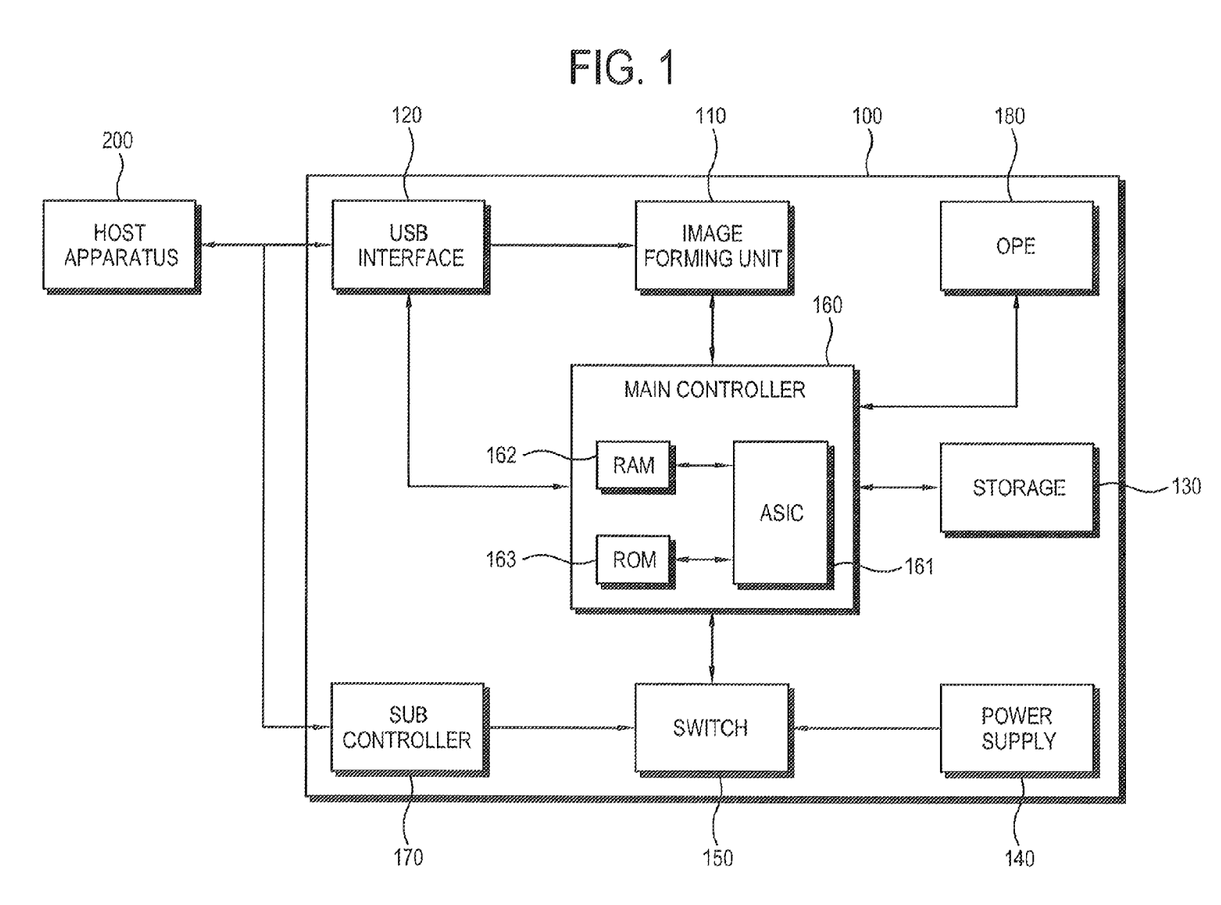
FIG. 1 is a functional block diagram of an image forming apparatus in accordance with an embodiment.

With reference to FIG. 1 illustrating a block diagram an image forming apparatus 100 in accordance with an embodiment, the image forming apparatus 100 may be embodied as a printer, a fax machine, a multi-functional printer, or the like, for example.

The image forming apparatus 100 may receive image data to be printed from a host apparatus 200, such as, for example, a personal computer a fax machine, a storage device such as a USB memory, or the like The image forming apparatus 100 may also obtain image data to be printed by receiving image data from an image scanning unit (not shown) configured to scan a target object. The image forming apparatus 100 is configured to form a corresponding image on a medium, such as, for example, a sheet of paper, based on the received or obtained image data.

In accordance with an embodiment, as shown in FIG. 1, the image forming apparatus 100 may include: an image forming unit 110 configured to form an image on a print; a host interface, for example, a USB interface 120 configured for data communication with the host apparatus 200; a storage 130 configured to store printing data; a power supply 140 configured to supply an operational power to various elements of the image forming apparatus 100; a switch 150 configured to allow selectable supply of the power to various elements of the image forming apparatus 100; a main controller 160 configured to control the operations of various elements of the image forming apparatus 100; and a sub controller 170 configured to control the switching operations of the switch 150 by, for example, monitoring the USB interface 120 when the main controller 160 is turned off.

The image forming apparatus 100 may further include an operating panel equipment (OPE) 180 having a key input that serves as a user interface through which user input is received and a display through which information, such as an operational state of the image forming apparatus 100, is displayed. The image forming apparatus 100 may further include an image scanning unit (not shown) configured to scan a target object and a fax unit, e.g., a modem (not shown), configured to convert image data generated by the image scanning unit to a fax signal to transmit to a remotely located fax machine or to receive a fax signal from the remote fax machine, through a fax network (e.g., a public switched telephone network (PSTN)), for example.

The image forming unit 110 may be configured to form an image on at least one medium, such as, for example, a sheet of paper, based on the corresponding printing data in response to a printing command. Such a printing operation may include a printing of received fax data, a printing of a scanned target object for the copying, and a printing of printing data received from the host apparatus 200 having, for example, a server or printing data stored in a built-in unit (HDD) or an extension unit (e.g., a USB memory). Such image may be formed by the image forming unit 110 with the use of a laser or by an inkjet method as known to those skilled in the art.

The USB interface 120, as an example of a host interface, is a communication module configured to transmit and receive data to and from the host apparatus 200 according to a universal serial bus (USB) standard, and may receive the printing data from the host apparatus 200. In accordance with an embodiment, the USB interface 120 may receive pre-setting data before receiving the printing data from the host apparatus 200 when the image forming apparatus 100 is in a sleep mode, allowing the printing to be initiated in the sleep mode.

The storage 130 may be configured to store printing data received from the host apparatus 200, fax data for fax transmission, scan data scanned by the image scanning unit, various configuration or parameter setting information for the image forming apparatus 100, user authentication information, and the like. The storage 130 may include a built-in storage medium such as HDD and/or an extension or a portable storage medium such as a USB memory, a memory card (a memory stick, a CF card, and an MMC), a memory card slot and the like.

The operational power may be a first power of about 24 V, i.e., a high voltage, for activating a fuser of the image forming unit 110. A second power, VCC_1W, of about 3.3 or 5 V for activating other elements may be supplied from the power supply 140. In accordance with an embodiment, the power supply 140 of the image forming apparatus 100 may be embodied as a switched mode power supply (SMPS).

The switch 150 may be employed to selectively supply power to various elements of the image forming apparatus 100. The switch 150 may be controlled by the main controller 160, the sub controller 170, or a combination thereof. In accordance with an embodiment, the switch 150 may be embodied as a sleep mode 1 W circuit that may be used to satisfy power consumption of 1 W or less during the sleep mode.

The main controller 160 may include an application specific integrated circuit (ASIC) 161 having a microprocessor and the like that executes computer instructions or a computer program for controlling operations of various elements of the image forming apparatus 100; a random access memory (RAM) and a read only memory (ROM) for the operation of the ASIC 161; and may also include various logic integrate circuits (not shown).

The image forming apparatus 100 may have multiple power states, one of which is a normal mode, where an image forming process is normally performed; and another of which is a sleep mode for reduced use of power, where power is reduced for, or not supplied to, some elements when the image forming process is not being performed. For example, during a sleep mode, power supply to elements other than the switch 150 and the sub controller 170 may be blocked or cut off.

According to an embodiment, if a specific; pre-determined period of time elapses in the normal mode without a printing command, the main controller 160 may change the power state from the normal mode to the sleep mode, and may control the switch 150 so as to turn off power supply to other elements except for the switch 150 and the sub controller 170. The pre-determined period of time for changing the power state to the sleep mode may be stored in the storage 130.

In accordance with an embodiment, when the image forming apparatus 100 is in the sleep mode, the second power of 3.3 or 5 V, for example, may be supplied from the power supply 140 to the switch 150 and the sub controller 170, while power supply to other elements, such as the main controller 160 and the image forming unit 110, may be substantially blocked.

The main controller 160 may be configured to notify the host apparatus 200, through the USB interface 120, of state information indicating that the image forming apparatus 100 is in the sleep mode.

The host apparatus 200 may monitor a power state of the image forming apparatus 100 by using a real-time monitoring function. The real-time monitoring function may be included in the driver software, for example.

To transmit printing data to the image forming apparatus 100 that is in the sleep mode, the host apparatus 200 may check the power state of the image forming apparatus 100 to determine if it is the sleep mode, and, if it is, may transmit pre-setting data to the image forming apparatus 100 before transmitting the printing data thereto. The pre-setting data may have a predetermined value or data bit pattern, for example, 1101 or the like, and may be stored in the storage 130 in advance. If the pre-setting data is received from the host apparatus 200 while in the sleep mode, during which the main controller 160 is turned off, the sub controller 170 may output a power control signal for causing the switch 150 to switch.

Figure 2:
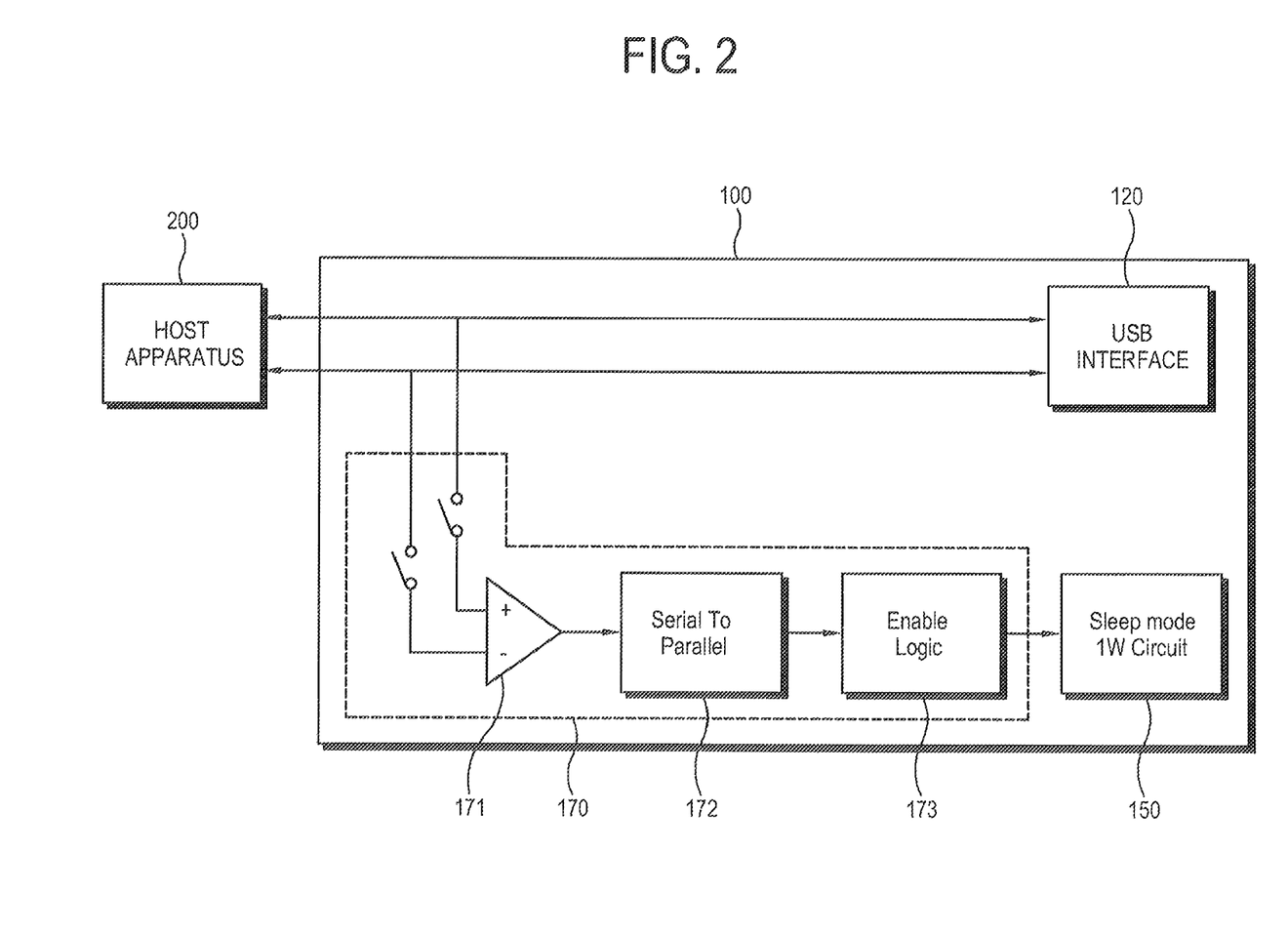
FIGS. 2 and 3 are circuit diagrams illustrative of a sub controller in accordance with an embodiment.
Figure 3:
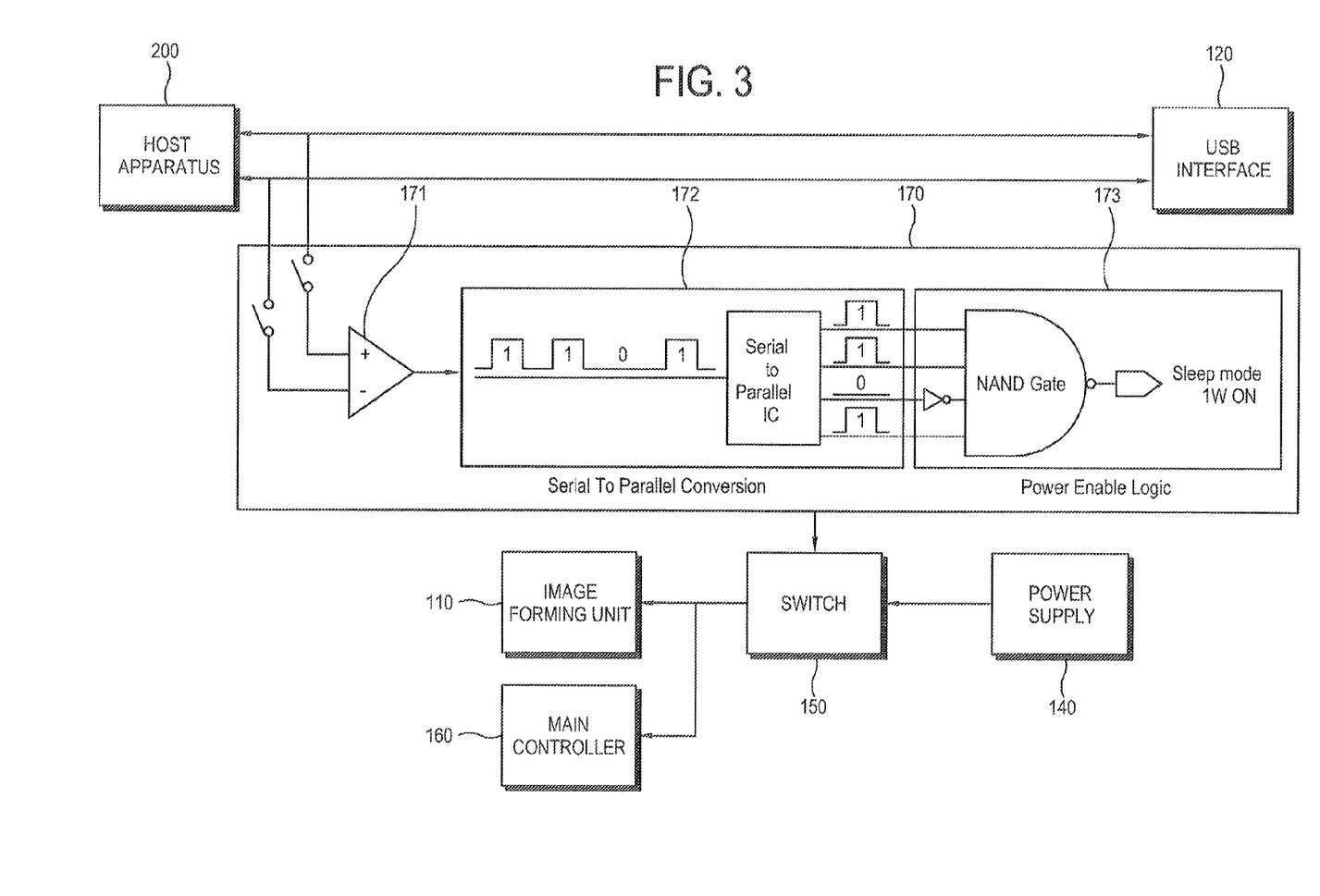

FIGS. 2 and 3 are circuit diagrams illustrating in greater details the sub controller 170 in accordance with an embodiment.

As shown in FIG. 2, in accordance with an embodiment, the sub controller 170 may include an amplifier 171, a serial to parallel circuit 172 and an enable logic circuit 173.

In the sleep mode, the amplifier 171 may receive the pre-setting data from the host apparatus 200 through a USB data line, and may amplify the received pre-setting data. In accordance with an embodiment, when the image forming apparatus 100 is in the sleep mode, each switch connected to ports of the USB data line, such as DP/DM ports, may be turned on, i.e., closed, and the USB interface 120 thus may not activated due to the blocking of power by the sub controller 170

If a printing command is received from a user, the driver software running on the host apparatus 200 may determine whether the power state of the image forming apparatus 100 is the sleep mode by using the real-time monitoring function, and may transmit the pre-setting data to the image forming apparatus 100 through the USB line.

The amplifier 171 may receive and amplify the pre-setting data transmitted through the USB line. The amplifier 171 may be embodied as, for example, a differential amplifier for amplifying the pre-setting data received through the DP/DM ports into serial data of a predetermined magnitude.

The amplified pre-setting data may be converted to parallel data through the serial to parallel circuit 172. According to an embodiment, the serial to parallel circuit 172 may be embodied as, for example, an integrated circuit (IC) chip that converts serial data to parallel data.

The converted parallel pre-setting data may be processed through the enable logic circuit 173 to generate a low signal. The generated low signal may be, for example, the sleep mode 1W signal for turning on the switch 150 in the sleep mode.

For example, with reference to FIG. 3, the pre-setting data may have the value 1101. As shown in FIG. 3, the serial data of 1101 amplified through the amplifier 171 may be converted to parallel data of 1, 1, 0 and 1 by the serial to parallel circuit 172.

The converted parallel data may be processed by the enable logic circuit 173, which according to an embodiment may include an inverter and a NAND gate, and output by the enable logic circuit 173 as the low signal. The enable logic circuit 173 may be embodied in various other configuration depending on the particular values chosen for the pre-setting data.

In response to the low signal output from the enable logic circuit 173, the switch 150 may be turned on or switch its state so that the power may be supplied to the elements of the image forming apparatus 100, including such as the image forming unit 110 and the main controller 160. Thus, the power state of the image forming apparatus 100 may switch from the sleep mode to the normal mode.

Figure 4:
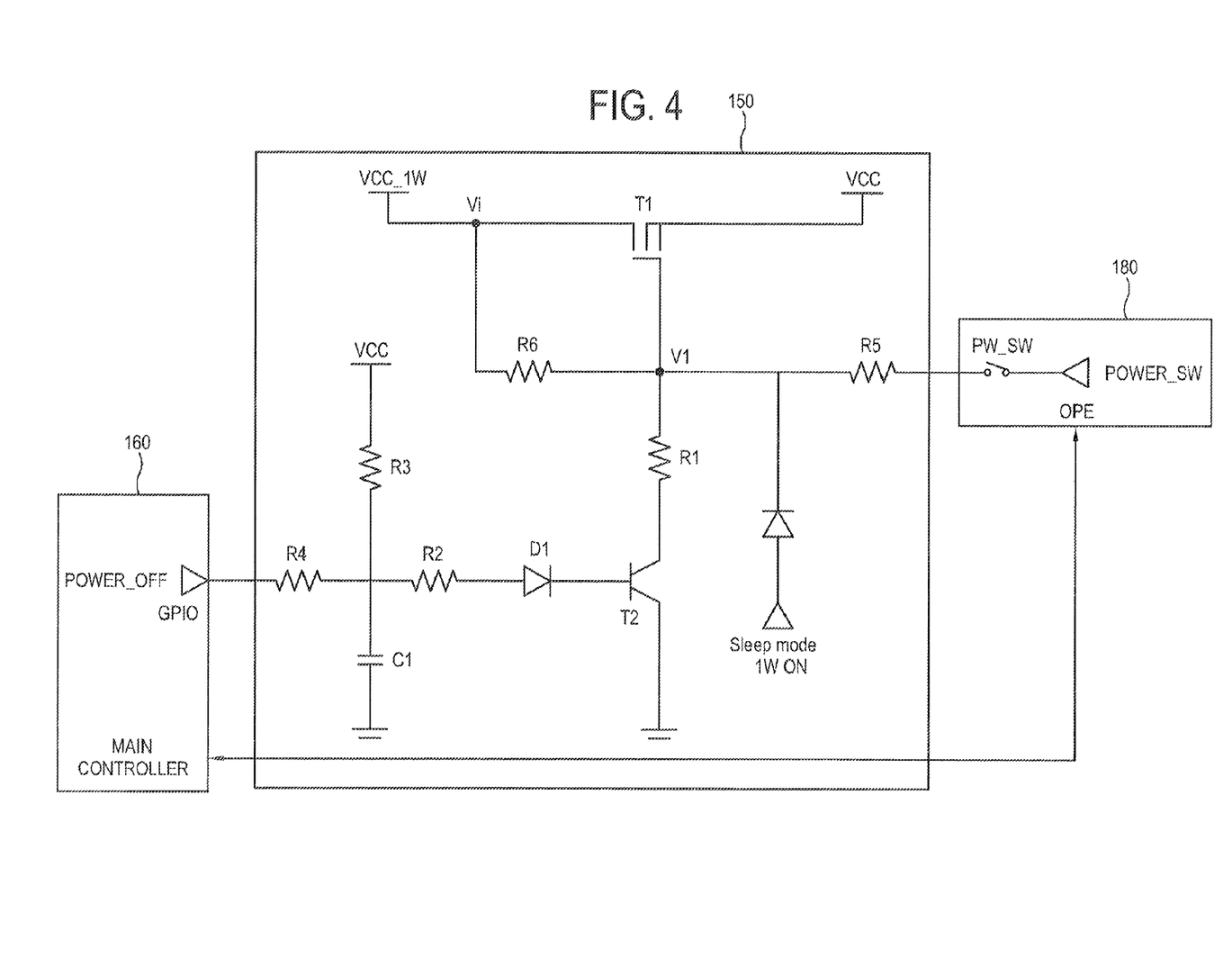
FIG. 4 is a circuit diagrams illustrative of a switch in accordance with an embodiment.

FIG. 4 is a circuit diagram of the switch 150 in accordance with an embodiment of the present disclosure. As shown in FIG. 4, the switch 150 may include a first transistor T1 that is turned on or off depending upon a control signal or signals outputted from one or more of the main controller 160, the sub controller 170 and the OPE 180. The first transistor T1 may be embodied as a field effect transistor (FET), for example. In accordance with an embodiment, the switch 150 may be provided on the main control board, i.e., on the same circuit board as the main controller 160, of the image forming apparatus 100.

According to an embodiment, the operational power VCC or the second power VCC_1W may be output from the first transistor T1 selectively depending on the level of the control potential V1. The input potential Vi may be identical to the potential of the second power VCC_1W. The resistor R6 may be interposed between the input potential Vi and the control potential V1.

The control potential V1 may serve as the gate voltage of the first transistor T1. Accordingly, when the control potential V1 is at a high level, the first transistor T1 may be turned off to output no operational power VCC. On the other hand, when the control potential V1 is at a low level; the first transistor T1 may be turned on to output the operational power VCC.

As shown in FIG. 4, even in the sleep mode, the second power VCC_1W supplied from the power supply 140 may still be connected to the switch 150. However, since the first transistor T1 is turned off, the power supply may be blocked and, as a result, the second power VCC_1W may not be outputted from the switch 150. Accordingly, there is substantially no power consumption in the image forming apparatus 100 since the load of the main board is close to zero.

As shown in FIG. 3, if the pre-setting data is received through the USB line in the sleep mode, resulting in the power control signal of low level being transmitted from the sub controller 170, the control potential V1 may become low to turn on the first transistor T1 of the switch 150 so that the switch 150 outputs the operational voltage VCC. Accordingly, an operational power may be supplied to the elements, such as the image forming unit 110, the main controller 160, the OPE 180 and the like, such that the power state is changed from the sleep mode to the normal mode, i.e., a wake-up mode If the power state of the image forming apparatus 100 is changed to the normal mode, a control signal may be outputted from the main controller 160 to maintain on-state of the switch 150, to thereby normally supply the operational power even if the power control signal of the sub controller 170 is allowed to return to the high level. The control signal may be outputted through a general purpose input/output (GPIO) port of the main controller 160, for example.

The switch 150 may be configured to determine the level of the control potential V1 such that the first transistor T1 is opened or closed depending on the control signal output by the main controller 160 through the GPIO port. The switch 150 may include a second transistor T2 that is turned on or off, depending on the control signal of the main controller 160, in such a manner the level of the control potential V1 may correspondingly change.

The second transistor T2 may be embodied as a bipolar transistor or the like. According to an embodiment, as illustrated in FIG. 4, the collector terminal of the second transistor T2 may be connected to the control potential V1 via a resistor R1 while the emitter terminal of the transistor T2 may be grounded. The base terminal of the second transistor T2 may be connected to the control signal output by the main controller 160 via resistors R2 and R4. A diode D1 may be interposed between the resistor R2 and the base terminal of the second transistor T2.

In accordance with an embodiment, if the level of the control signal is high, the second transistor T2 may be closed. On the other hand, if the level of the control signal is low, the second transistor T2 may be open. When the second transistor T2 is closed, a closed circuit may be formed along the path that includes the input potential Vi, the control potential V1 and the second transistor T2.

In accordance with an embodiment, values of the resistors R1 and R6 may be selected such that the control potential V1 when the second transistor T2 is closed has a level sufficient to turn on the first transistor T1.

Accordingly, in accordance with an embodiment, when the second transistor T2 is closed, the level of the control potential V1 may be low to turn on the first transistor T1. When the second transistor T2 is open, as there is no longer a closed circuit through the second transistor T2, the level of the control potential V1 may be high so as to cause the first transistor T1 to be turned off.

In accordance with an embodiment, the image forming apparatus 100 may include a power switch PW_SW embodied as a portion of the OPE 180 that is turned on or off according to the user manipulation. The power switch PW_SW may be embodied, for example, as a button switch that is turned on only when it is pushed by a user and that turns off when it is released. One end of the power switch PW_SW may be connected to the control potential V1 via a resistor R5.

The level of the control potential V1 in the switch 150 may be determined such that the first transistor T1 is opened or closed depending on the state of the power switch PW_SW.

For example, if the power switch PW_SW is turned on in the sleep mode, the level of the control potential V1 may be low to turn on the first transistor T1, thereby allowing the switch 150 to output the operational voltage VCC. Accordingly, the power state of the image forming apparatus 100 may be changed from the sleep mode to the normal mode by user input through the OPE 180.

Therefore, in accordance with an embodiment, as no power is supplied to other elements, such as the main controller 160, except for the switch 150 and the sub controller 170 when the image forming apparatus 100 is in the sleep mode, the power of only several milli-Amps or less may be consumed by the image forming apparatus 100.

Further, the switch 150 may be turned on by the sub controller 170, which monitors whether a signal is received from the USB data line, and which, responsive to the received data, may cause the power state of the switch 150 to change to the normal mode to perform the normal printing, thereby improving the reliability and/or responsiveness of the image forming apparatus 100 in the sleep mode.

If the switch 150 is turned on by a power control signal of the sub controller 170 according to the pre-setting data, the power may be supplied to various elements, such as the main controller 160 and the image forming unit 110. Accordingly, the ASIC 161, the RAM 162, the ROM 163, and the like in the main controller 160 may become active to change the power state thereof from the sleep mode to the normal mode.

As the power state is changed from the sleep mode to the normal mode, a communication reporting that the system has returned to the normal state may be transmitted from the main controller 160 to the host apparatus 200 through the USB interface 120. Then, printing data may be transmitted by the driver software in the host apparatus 200. The image forming unit 110 may be controlled by the main controller 160 to perform the printing based on the received printing data.

Figure 5:
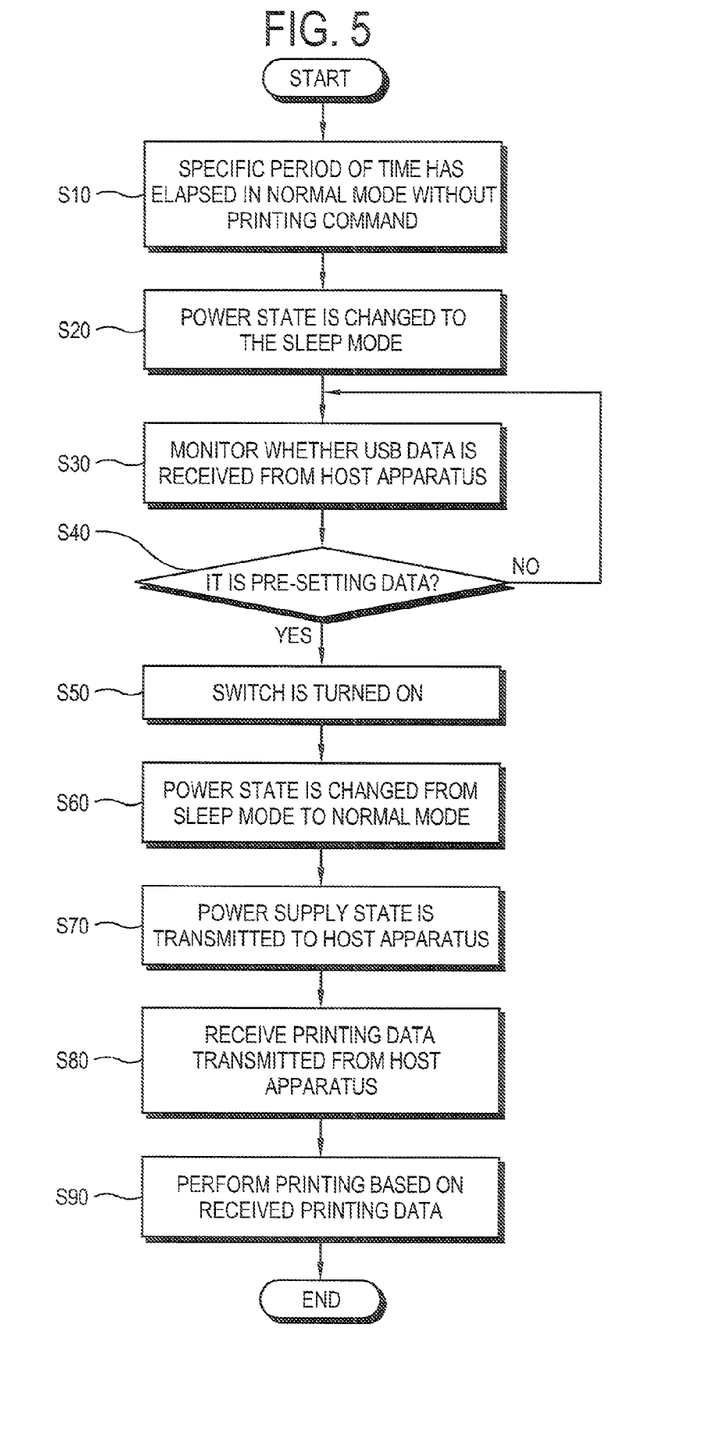
FIG. 5 is a flowchart illustrative of an operation of the image forming apparatus in accordance with an embodiment.

FIG. 5 is a flowchart showing an operation of the image forming apparatus 100 in accordance with an embodiment.

A specific period of time may have elapsed in the normal mode without a printing command from the host computer or from the user (S10). The specific period of time may be pre-determined, and may be stored in the storage 130 in advance as the period of time of inactivity before changing the power state of the image forming apparatus 100 to the sleep mode.

If the specific period of time has elapsed in the sleep mode without the printing command, the power state of the image forming apparatus 100 is changed from the normal mode to the sleep mode (S20). In accordance with an embodiment, in the sleep mode, no power may be supplied to elements of the image forming apparatus 100, such as the image forming unit 110, the OPE 180 and the main controller 160, except for the switch 150 and the sub controller 170.

If the specific period of time has elapsed in the normal mode without the printing command, a control signal for turning off the switch 150 may be output by the main controller 160 to block the supply of power.

A communication reporting that the power state of the image forming apparatus 100 is changed to the sleep mode may be sent from the main controller 160 to the host apparatus 200. By using the real-time monitoring function of the driver software, the host apparatus 200 may receive and store power state information of the image forming apparatus 100.

The sub controller 170 may monitor whether USB data is received from the host apparatus 200 (S30). If a printing command is received from a user, the pre-setting data may be transmitted from the host apparatus 200. The pre-setting data may have a predetermined value or bit pattern, e.g., 1101 or the like, and may be stored in the storage 130 in advance.

The sub controller 170 may determine whether or not the received USB data matches the pre-setting data (S40). Then, a power control signal for turning on the switch 150 may be outputted from the sub controller 170 as the result of determining that the USB data that matches the pre-setting data is received.

The switch 150 may then be turned on (S50). Specifically, in the process at S50, in the sub controller 170, the monitored USB data as serial data may be amplified; the amplified serial data may be converted to parallel data; and the converted parallel data may be processed to generate a low signal for turning on the switch 150. Such low signal may be output by the sub controller 170.

Thus, if the received USB data is the pre-setting data, as determined in the process at S40, the signal outputted by the sub controller 170 in the process at S50 may be the sleep mode 1W ON signal for turning on the switch 150.

The power may be supplied to various elements, such as the main controller 160 and the image forming unit 110, thereby switching the power state of the image forming apparatus 100 to the normal mode (S60).

The USB interface 120 may be controlled by the main controller 160 such that power supply state information indicating that the power state of the image forming apparatus 100 has been changed to the normal mode, and that various elements of the image forming apparatus 100 are in the wake-up mode, may be transmitted to the host apparatus 200 (S70).

In response to the power supply state information received in the process at S70, printing data may be transmitted by the host apparatus 200, for example, through the driver software thereof. The USB interface 120 may be controlled by the main controller 160 to receive the printing data transmitted from the host apparatus 200 (S80).

The image forming unit 110 may be controlled by the main controller 160 such that, based on the printing data received in the process at S80, the printing is performed (S90).

According to one or more aspects of the oresent disclosure, the image forming apparatus and the method of controlling the same in accordance with the various embodiments described herein are capable of reducing power consumption by turning off the power to the main controller during the sleep mode.

Further, it is possible to improve the operational reliability and/or responsiveness in the sleep mode by the use of a sub controller that, during when the main controller is turned off, monitors data received through the host interface, for example, a USB interface, and that allows the main controller to be turned back on for operation in the normal mode.

While the disclosure has been particularly shown and described with reference to several embodiments thereof with particular details, it will be apparent to one of ordinary skill in the art that various changes may be made to these embodiments without departing from the principles and spirit of the invention, the scope of which is defined in the following claims and their equivalents.

What is claimed is:

1. An image forming apparatus, comprising:
an imaging forming unit configured to form an image;
a main controller configured to control an operation of the imaging forming unit;
a universal serial bus (USB) interface configured to receive and to transmit USB data from and to a host apparatus;
a power supply configured to supply power to the image forming unit and the main controller;
a switch configured to selectively supply power to various elements of the image forming apparatus based upon a control signal of the main controller; and
a sub-controller configured to output a power control signal for turning on the switch in response to USB data received from the host apparatus being a pre-setting data having a predetermined value when the image forming apparatus is in a sleep mode, wherein the sleep mode comprises a power mode during which the main controller is turned off,
wherein the main controller is configured to maintain an on state of the switch even if the power control signal output by the sub-controller changes after a change in a power state of the main controller from the sleep mode to a normal mode.

2. The image forming apparatus of claim 1, wherein the sub-controller comprises:
an amplifier configured to amplify a serial signal received from the host apparatus;

a serial to parallel circuit configured to convert the amplified serial signal to a parallel signal; and an enable logic circuit configured to generate the power control signal for turning on the switch by receiving and processing the converted parallel signal.

3. The image forming apparatus of claim 1, wherein when the switch is turned on in response to the power control signal output from the sub-controller, the switch supplies power to the main controller so as to change a power state of the main controller from the sleep mode to the normal mode.

4. The image forming apparatus of claim 3, wherein:

information indicative of the power state of the main controller is transmitted to the host apparatus through the USB interface, and wherein printing data is received from the host apparatus subsequent to the transmission of the information indicative of the power state of the main controller being the normal mode.

5. The image forming apparatus of claim 1, further comprising a storage device configured to store information relating to a duration of time the image forming apparatus is to remain idle before a change in the power state of the image forming apparatus from a normal mode to the sleep mode is to take place, wherein the main controller causes the switch to be turned off if the duration of time has elapsed without receiving a printing command.

6. A method of controlling an image forming apparatus, the image forming apparatus including an imaging forming unit configured to form an image; a main controller configured to control an operation of the imaging forming unit, a universal serial bus (USB) interface configured to receive and to transmit USB data from and to a host apparatus, a power supply configured to supply power to the image forming unit and the main controller and a switch configured to selectively supply power to various elements of the image forming apparatus under a control of the main controller, the method comprising:

monitoring whether USB data is received from the host apparatus while the image forming apparatus is in a sleep mode, the sleep mode being a power mode during which the main controller is turned off; and outputting a power control signal from a sub-controller for turning on the switch based on the received USB data, wherein outputting the power control signal is performed if the received USB data comprises a pre-setting data having a predetermined value, and wherein the main controller is configured to maintain an on state of the switch even if the power control signal output by the sub-controller changes after a change in a power state of the main controller from the sleep mode to a normal mode.

7. The method of claim 6, wherein the outputting of a power control signal comprises:

amplifying a serial signal received from the host apparatus;

converting the amplified serial signal to a parallel signal; and generating the power control signal for turning on the switch by processing the converted parallel signal.

8. The method of claim 6, further comprising changing a power state of the main controller from the sleep mode to the normal mode by turning on the switch to supply the power to the main controller.

9. The method of claim 8, further comprising:

transmitting information indicative of the power state of the main controller to the host apparatus; and receiving printing data from the host apparatus.

10. The method of claim 6, further comprising:

changing the power control signal to an off signal; and controlling the switch to maintain an on state of the switch.

11. The method of claim 6, further comprising:

storing information relating to a time duration without a printing command before changing the power mode of the image forming apparatus from a normal mode to the sleep mode; and controlling the switch to be turned off to change the power mode of the image forming apparatus to the sleep mode if the time duration has elapsed.

12. An image forming apparatus for forming an image based on image data received through a communication interface and for operating selectively in at least a normal mode and a sleep mode in which the image forming apparatus consumes less power than in the normal mode, comprising:

a main controller configured to control image forming operation of the imaging forming apparatus;

a switch switchable between an ON state in which the main controller is allowed to receive operational power so as to allow the image forming apparatus to operate in the normal mode and an OFF state in which the main controller does not receive the operational power so as to cause the image forming apparatus to operate in the sleep mode, the switch being configured to switch to the OFF state in response to a first power control signal received from the main controller; and a sub-controller configured to receive data from the communication interface and to output, based on the data received from the communication interface, a second power control signal to the switch, the second power control signal that causes the switch to switch to the ON state, wherein the sub-controller is further configured to determine whether the data received from the communication interface matches a pre-setting data and to output the second power control signal upon determination that the received data matches the pre-setting data, and wherein the main controller is configured to maintain an ON state of the switch even if the second power control signal output by the sub-controller changes after a change in a power state of the main controller from the sleep mode to the normal mode.

13. The image forming apparatus of claim 12, wherein the main controller is configured output the first power control signal upon determination that a pre-determined period of time has elapsed in the normal mode without a printing command being received thorough the communication interface.

14. The image forming apparatus of claim 12, further comprising:

a data storage device having stored therein the pre-setting data.

15. The image forming apparatus of claim 12, wherein the communication interface comprises a universal serial bus (USB) interface.

16. The image forming apparatus of claim 12, wherein the sub-controller consumes less power to operate than the operational power of the main controller.

* * * * *